United States Patent
Feldmann et al.

(10) Patent No.: US 9,945,241 B2
(45) Date of Patent: Apr. 17, 2018

(54) SEALING ELEMENT OF AN AXIAL TURBOMACHINE

(71) Applicant: MTU Aero Engines AG, Munich (DE)

(72) Inventors: Manfred Feldmann, Eichenau (DE); Janine Sangl, Dachau (DE)

(73) Assignee: MTU AERO ENGINES AG, Munich (DE)

( * ) Notice: Subject to any disclaimer, the term of this patent is extended or adjusted under 35 U.S.C. 154(b) by 284 days.

(21) Appl. No.: 14/495,058

(22) Filed: Sep. 24, 2014

(65) Prior Publication Data

US 2015/0102565 A1 Apr. 16, 2015

(30) Foreign Application Priority Data

Sep. 25, 2013 (EP) .................................... 13185903

(51) Int. Cl.
| | |
|---|---|
| *F01D 25/24* | (2006.01) |
| *F01D 11/00* | (2006.01) |
| *F16J 15/08* | (2006.01) |

(52) U.S. Cl.
CPC .......... *F01D 11/005* (2013.01); *F01D 25/246* (2013.01); *F16J 15/0887* (2013.01); *F05D 2240/11* (2013.01); *F05D 2250/713* (2013.01); *F05D 2250/75* (2013.01)

(58) Field of Classification Search
CPC ............. F16J 15/00; F16J 15/02; F16J 15/027
See application file for complete search history.

(56) References Cited

U.S. PATENT DOCUMENTS

| | | | | |
|---|---|---|---|---|
| 3,394,915 | A * | 7/1968 | Gachot ................. | F16K 5/0631 251/174 |
| 4,575,099 | A * | 3/1986 | Nash ....................... | F02K 1/805 239/265.37 |
| 4,582,080 | A * | 4/1986 | Stock .................... | F16K 1/2285 137/74 |
| 4,597,596 | A * | 7/1986 | Tozer ..................... | F16L 27/02 277/616 |
| 5,143,292 | A * | 9/1992 | Corsmeier ............... | F02K 1/12 239/127.3 |
| 5,474,306 | A | 12/1995 | Bagepalli et al. | |
| 5,505,498 | A * | 4/1996 | Hailing ................ | F16L 27/067 277/626 |
| 6,093,887 | A * | 7/2000 | Ponto ................... | H05K 9/0016 174/377 |
| 7,101,147 | B2 * | 9/2006 | Balsdon ................ | F01D 11/005 277/642 |

(Continued)

FOREIGN PATENT DOCUMENTS

GB 2080439 A 2/1982

*Primary Examiner* — Vishal A Patel
(74) *Attorney, Agent, or Firm* — Barlow, Josephs & Holmes, Ltd.

(57) ABSTRACT

The present invention relates to a sealing element (100) of an axial turbomachine for the sealing of regions at or in at least two static components of the turbomachine, wherein the components can be moved axially relative to one another. The sealing element (100) has a first radial region (1) with a first stiffness or rigidity and a second radial region (5) with a second stiffness or rigidity, wherein the first stiffness and the second stiffness are different from one another, and the sealing element (100) is configured as segmented in the peripheral direction of the turbomachine.

7 Claims, 4 Drawing Sheets

(56) References Cited

U.S. PATENT DOCUMENTS

| | | | |
|---|---|---|---|
| 2004/0251639 A1 | 12/2004 | Parker | |
| 2005/0023769 A1* | 2/2005 | Hailing | F16J 15/0887 277/602 |
| 2007/0235948 A1* | 10/2007 | Hailing | F16J 15/0887 277/626 |
| 2008/0224422 A1* | 9/2008 | Hailing | F16J 15/022 277/644 |

* cited by examiner

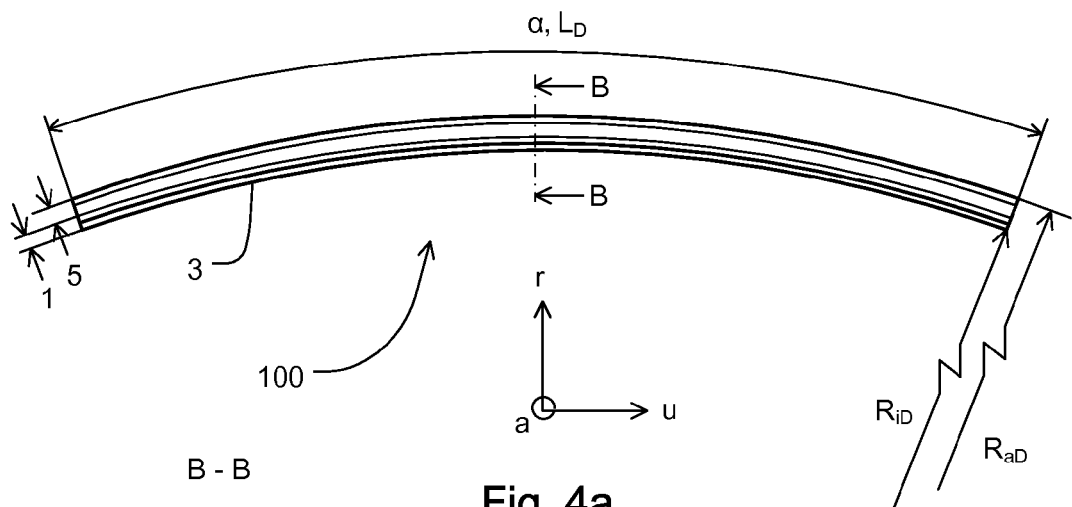
Fig. 4a
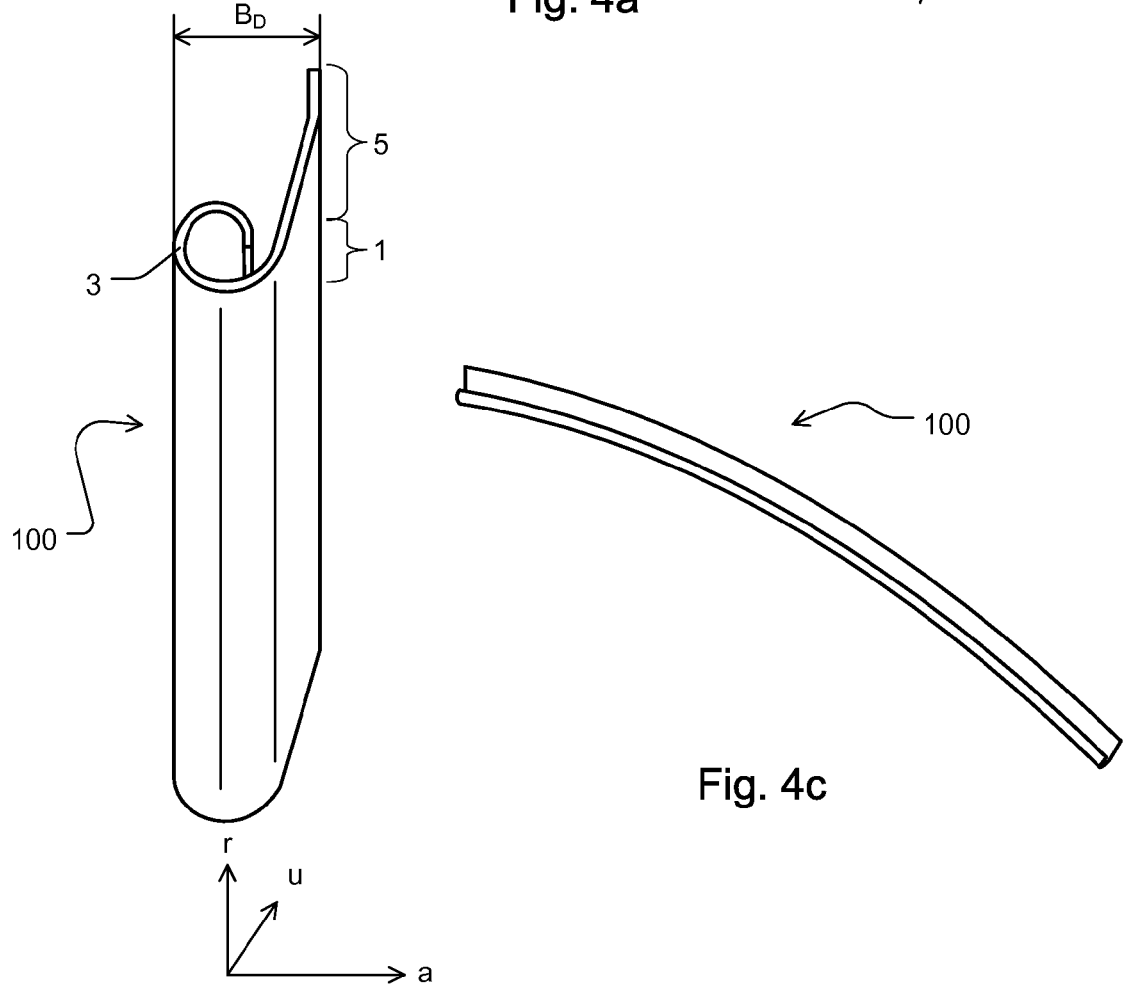
Fig. 4b
Fig. 4c

SEALING ELEMENT OF AN AXIAL TURBOMACHINE

BACKGROUND OF THE INVENTION

The present invention relates to a sealing element of an axial turbomachine for the sealing of regions at or in at least two static components.

A number of regions are often sealed in turbomachines. For example, bearings are sealed against flow media, or outer housing regions in the turbomachine are sealed against hot or aggressive flow media. For this purpose, the outer housing regions may have cooling channels, hollow spaces, and guide vane suspensions with retaining plates. The seals can be labyrinth seals or contacting seals. In the case of contacting seals, manufacturing or assembly tolerances or thermal expansions of individual components may lead to failure of the seal in the operating state.

BRIEF SUMMARY OF THE INVENTION

An object of the present invention is to propose a sealing element of an axial turbomachine, with which, for example, manufacturing or assembly tolerances of static components of the turbomachine or thermal expansions can be compensated for in the operating state of the turbomachine, without the circumstance that the sealing element loses its sealing function or at least that the sealing function is not substantially reduced.

The object according to the invention is achieved by a sealing element of the present invention.

Therefore, according to the invention, a sealing element of an axial turbomachine, in particular, a gas turbine is proposed for the sealing of regions at or in least two static components of the turbomachine. The static components can be moved axially relative to one another, for example, in order to be able to equilibrate specific manufacturing or assembly tolerances or to be able to compensate for thermal expansions in the operating state. The sealing element according to the invention has a first radial region with a first stiffness or rigidity and a second radial region with a second stiffness or rigidity, with the first and the second stiffness being different from one another. The sealing element is configured as segmented in the peripheral direction of the turbomachine.

In all of the preceding and following statements, the use of the expression "can be" or "can have", etc. is understood to be synonymous with "preferably is" or "preferably has", etc. and shall explain embodiments according to the invention.

Whenever numerical words are named herein, the person skilled in the art understands these as data for a numerically lower limit. As long as this does not lead to a contradiction recognizable to the person skilled in the art, the person skilled in the art therefore always reads, for example, "at least one" for the data point "one". This understanding is also covered by the present invention as well as the interpretation that a numerical word, such as "one", for example, can alternatively mean "exactly one", where this is always technically possible, recognizable to the person skilled in the art. The present invention comprises both interpretations and this applies to all of the numerical words used herein.

Advantageous enhancements of the present invention in each case are the subject of the embodiments of the present invention.

Embodiments according to the invention may have one or more of the features named in the following.

In the following, gas turbines are described in particular as turbomachines, purely by way of example, without, however, the desire to limit turbomachines to gas turbines.

In specific embodiments according to the invention, static components of the gas turbine are components that are not to be included in the rotating components of the gas turbine. The rotating components are essentially one or more shafts, rotor disks, and components that are joined to the shaft or shafts, and/or the rotor disks. Static components can move or can be actively moved such as, for example, housing regions, guide vanes, housing flaps, cooling elements or valves. The static components can be moved actively or passively. Passively moved static components can move due to thermal deformations or because of tolerances (e.g., clearance fits), particularly in guides or grooves.

In some embodiments according to the invention, the sealing elements are provided in the housing regions of gas turbines for the purpose of sealing guide vanes, guide vane suspensions, cooling channels or housing walls against hot flow media. Sealing elements can seal the flow channel against the hot flow medium, or against other housing regions into which the hot flow medium flows or passes through. These can be, in particular, housing regions that have an inlet lining on the housing side (for the grazing of tips of rotating blades or shrouds of rotating blades), a seal support, securing elements, or the like.

In specific embodiments according to the invention, the sealing elements are utilized as throttles in order to reduce, for example, a flow volume (through-flow). By means of a sealing element, in particular, the through-flow in a bypass can be influenced, in addition to a primary flow through guide vanes and rotating blades. A sealing element can act in a pressure-reducing manner.

In certain embodiments according to the invention, the sealing elements can be disposed in so-called outer-air-seal (OAS) regions of the housing.

In several embodiments according to the invention, the sealing element is disposed at or in modular interfaces of the housing and/or at transition channels in the gas turbine.

In specific embodiments according to the invention, the first region of the sealing element is a region lying radially inward, directed toward the axis of rotation of the gas turbine, or a region disposed radially inside, and the second region of the sealing element is a region lying radially outward, directed toward the outer region of the housing of the gas turbine, or a region disposed radially outside. For example, the first region comprises approximately one-third or approximately one-half of the radial length of the sealing element, and the second region correspondingly comprises approximately two-thirds or approximately one-half of the radial length of the sealing element. Likewise, the radial first region of the sealing element can be a radially outer-lying or radially outer-disposed region, and the second region can be disposed lying radially inside.

The term "stiffness" or "rigidity", as it is used herein, denotes a resistance of the sealing element or of regions or segments of the sealing element to an elastic deformation. An elastic deformation can be brought about or caused by a force, a torque, or by a difference in pressure. In an installed state of the sealing element between two static components of the turbomachine, for example, the sealing element can be elastically deformed as a consequence of a thermal expansion of the components in the operating state (axial displacement of the components relative to one another or against one another). A resistance to this deformation occurs due to the stiffness or rigidity of the sealing element (or of regions or segments of the sealing element). Due to the different stiffness of the first and second radial regions of the sealing element according to the invention, the resistance thus differs in the two regions. This can lead to different deformations of the first and second regions due to the different stiffnesses.

In certain embodiments according to the invention, the stiffness of the sealing element (or of regions or segments of the sealing element) is dependent on the material.

In some embodiments according to the invention, the stiffness of the sealing element (or of regions or segments of the sealing element) is dependent on the geometry of the sealing element.

The stiffness of the sealing element can be a stiffness or rigidity to bending, a rigidity relative to extension, a rigidity relative to torsion, or a combination of the different stiffnesses. In the installed state of the sealing element in the axial turbomachine, in particular, the rigidity relative to bending and/or the rigidity relative to torsion (torsion in the peripheral direction of the segmented sealing element) can be relevant for the sealing function, if at least one radial region of the sealing element is fixed in or at a static component of the turbomachine.

The sealing element configured as segmented according to the invention can be designated as a segment of a segmented or multi-part sealing ring in several embodiments according to the invention. A segment can be designated as a ring segment. Several ring segments can be disposed annularly and form a complete ring over 360 degrees in the peripheral direction. The ring segments can be disposed overlapping at their ends in the peripheral direction or can be disposed flush (the end surfaces directly abutting one another) or can be placed side by side.

In specific embodiments according to the invention, a sealing element can be described by means of the dimensions: inner radius $R_{iD}$ (radius from the axis of rotation of the gas turbine up to the radially inner end of the sealing element; outer radius $R_{aD}$ (radius from the axis of rotation of the gas turbine up to the radially outer end of the sealing element); arc length $L_D$ (length of the segment perimeter); width $B_D$ (extent or length of the sealing element in the axial direction); and mid-point angle $\alpha$ (angle over the arc length referred to the axis of rotation of the gas turbine).

In some embodiments according to the invention, the minimum mid-point angle $\alpha_{Min}$ amounts to 15 degrees, and the maximum mid-point angle $\alpha_{Max}$ is 180 degrees. The stiffness, particularly the rigidity relative to bending of the sealing element in the installed state in the gas turbine can be essentially smaller for an angle $\alpha$ of 15 degrees than for an angle $\alpha$ of 180 degrees.

In specific embodiments according to the invention, the first stiffness or rigidity of the first radial region is greater than the second stiffness or rigidity of the second radial region. In addition, in this example of embodiment, the first radial region with the greater stiffness (as compared to the second radial region) is fixed in a static component of the gas turbine.

In some embodiments according to the invention, the first radial region of the sealing element is fixed in a groove in a static component of the turbomachine. A groove can be an annular or segmented housing groove, for example. Likewise, a groove can be configured or disposed in a static housing region or guide vane region by means of annular or segment-shaped securing elements, for example, for fixing and/or securing cooling air channels. The fixation of the first region of the sealing element in the groove can at least largely prevent or block a deformation, particularly an elastic deformation, of the sealing element, as long as the groove itself is not elastically deformable.

In certain embodiments according to the invention, the first radial region of the sealing element is fixed at a web in a static component of the turbomachine. A web can be an edge, an encircling or segmented web of a sheet metal or a web of a housing region. In particular, the web is an edge of an end region of a securing sheet metal, which is fixed at the housing.

In several embodiments according to the invention, the first region of the sealing element is designed in spiral shape or hook shape. A spiral-shaped or hook-shaped region of the sealing element can have a stiffening effect. This stiffening effect can be utilized advantageously for a fixing in place, for example, in a groove. Expressed in other words, a spiral-shaped or hook-shaped region of the sealing element can be a fixing component of the sealing element with an essentially stiffening effect.

In specific embodiments according to the invention, the second stiffness or rigidity of the second radial region of the sealing element is smaller than the first stiffness or rigidity of the first radial region. In this example of embodiment, the second radial region has a sealing surface. The sealing surface can have the form of a ring segment and can be aligned perpendicular to the axial direction of the gas turbine. In addition to the sealing surface, the second radial region can have a diagonal transition region (diagonal in axial direction and in radial direction) between the first radial region and the sealing surface. This transition region is particularly of importance for the sealing function of the sealing surface, in that, in the installed state, on the one hand, the sealing element is fixed in place in a groove by the first region, for example, and on the other hand, the sealing element is pressed by the sealing surface at a static component, particularly in the axial direction. This can result, in particular, by means of pre-stressing, in that the sealing element, which is already fixed in place by the first region, is compressed in the axial direction, and is thus pre-stressed. The pre-stressing force is particularly dependent on the stiffness of the second radial region of the sealing element.

In specific embodiments according to the invention, the sealing effect of the sealing element is at least reinforced by an applied pressure difference, in that a higher pressure prevails in the housing region, which acts on the sealing element, against the pressure in the further housing region to be sealed.

In some embodiments according to the invention, the first radial region of the sealing element is disposed at a seal support of an inlet lining for a rotating blade or for a rotating blade shroud. The seal support can form a limiting surface of a groove, in which the first region of the sealing element is fixed. Additional limiting surfaces of the groove can be, for example, securing elements in a housing region.

In certain embodiments according to the invention, the sealing surface is applied at a guide vane suspension at the housing of the gas turbine or is disposed at the guide vane suspension.

In several embodiments according to the invention, the regions to be sealed are disposed in a high-pressure turbine region and/or in a low-pressure turbine region.

In certain embodiments according to the invention, the regions to be sealed in the housing of the turbomachine are disposed between the high-pressure turbine region and the low-pressure turbine region.

In specific embodiments according to the invention, the regions to be sealed are disposed between a combustion chamber on one side and a high-pressure turbine region or high-pressure compressor region on the other side.

In some embodiments according to the invention, the sealing element is a spiral sheet metal piece.

Some or all of the embodiments according to the invention can have one, several, or all of the above-named advantages as well as the advantages named in the following.

Advantageously, with the sealing element according to the invention, a reduction of the components in the housing region of a gas turbine can be achieved when compared to a sealing element with a separate spring element.

In addition, advantageously, forces can be distributed more favorably over the entire sealing element, due to the segmented configuration of the sealing element, with which the pre-stressing forces can be distributed in the installed state—not only in the axial direction, but also additionally in the peripheral direction of the sealing element. Due to this smaller material load of the elastic region or regions of the sealing element, the creep deformation (time-dependent and/or temperature-dependent plastic deformation under a load) of the elastic regions can be reduced. Creep deformations may occur due to axial displacements of the static components and/or due to pressure loads over the sealing element (e.g. due to elevated pressure of the flow-through medium opposite a pressure in the guide vane region, against which it is sealed or against other outer regions of the housing).

In addition, the stiffness of the sealing element, overall or individual regions, in particular of the region that is elastically deformed and/or is pre-stressed, can be achieved by different thickness of the sheet metal, for example, of a spiral sheet metal piece.

The stiffness of the sealing element, overall or individual regions, in addition, can be modified advantageously by different materials and adapted as needed to an installation situation.

In addition, the stiffness of the sealing element can be adapted by the geometry of the sealing element, overall or individual regions.

Advantageously, the sealing element can be applied at different modular interfaces and/or transition channels in the gas turbine, in particular, at thermally highly loaded regions in turbomachines.

BRIEF DESCRIPTION OF THE DRAWINGS

The present invention will be explained by examples in the following, based on the appended drawings, in which identical reference numbers designate the same or similar components. The following applies to each of the schematically simplified figures:

FIGS. 4a, b, c show a sealing element according to the invention in different perspective view.

DETAILED DESCRIPTION OF THE INVENTION

Figure 1:
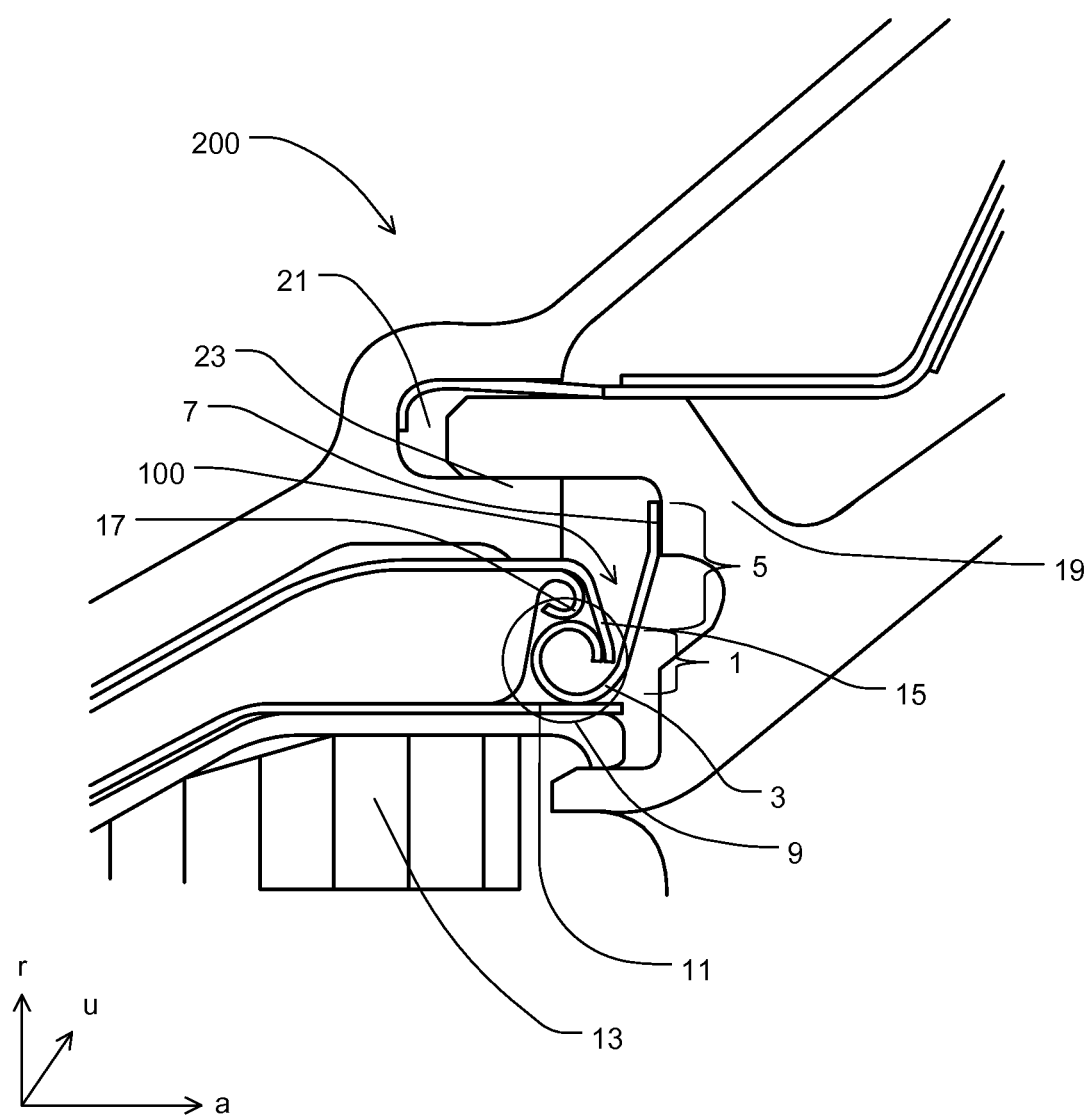
FIG. 1 shows a sectional view of an outer housing region of a gas turbine with a sealing element according to the invention.

FIG. 1 shows a sectional view of an outer housing region 200 of a gas turbine with a sealing element 100 according to the invention and several static components.

In this example of embodiment, the sealing element 100 is a spiral sheet metal piece segmented in the peripheral direction u (perpendicular to the plane of the drawing) and has, as the first radial region 1, a spiral 3 as a fixing component operating in a stiffening way). A sealing surface 7 is shown inside a second radial region 5 on the radially outer end in the direction of the housing wall.

The spiral 3 is fixed at a web 15 directed radially essentially toward the inside.

The sealing surface 7 is applied at a front guide vane hook 19, which is guided in a housing groove 21. The housing groove 21 has a housing web 23. The front guide vane hook 19 can move axially in the housing groove 21. In the case of an axial movement of the front guide vane hook 19, the sealing surface 7 is also moved axially. If it is required that the spiral 3 that is fixed at the web 15 does not move axially, then consequently, the second radial region 5 elastically deforms. This deformation depends on the stiffness of the second radial region 5. If the stiffness or rigidity is high, then the resistance to this elastic deformation is also high. Likewise, the resistance to elastic deformation is low, if the stiffness or rigidity is low. The stiffness can be adapted to the anticipated axial displacement distances, in that, for example, the sheet metal thickness of the segmented spiral sheet metal piece 100 is varied, and/or the material selected for the segmented spiral sheet metal piece 100 (sealing element 100) is adapted correspondingly. The stiffness or rigidity of the first radial region 1, in contrast, should be high, since this first radial region 1 is fixed at the web 15.

Purely by way of example, for installation tolerances and/or manufacturing tolerances, axial displacement distances in the operating state of the gas turbine can lie, for example, at approximately 0.5 mm to 1 mm, and in the case of thermally conditioned, axial displacement distances, at approximately 1 mm to 3 mm, in particular, 2 mm.

Figure 2:
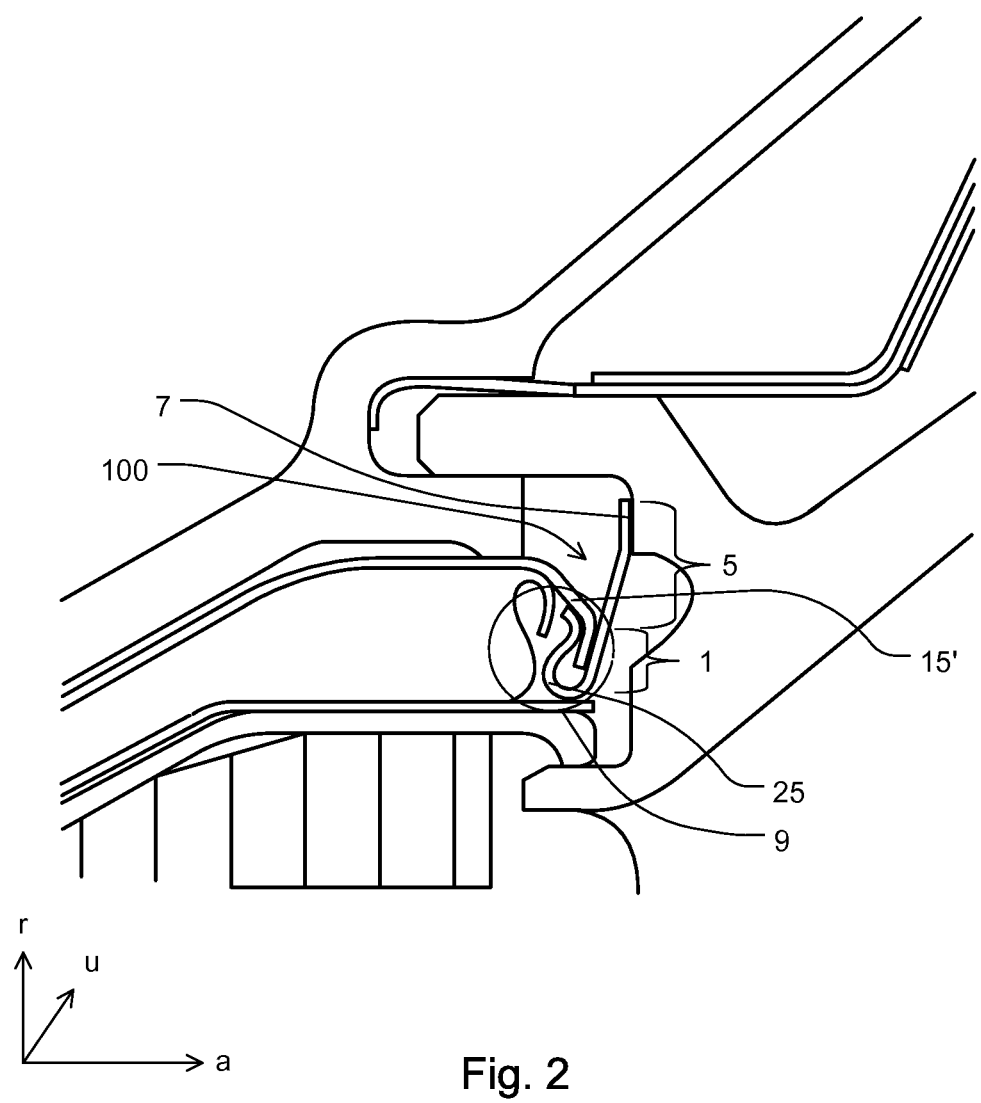
FIG. 2 shows another sealing element according to the invention in a view according to FIG. 1.

FIG. 2 shows another sealing element 100 according to the invention in a view according to FIG. 1.

In this example of embodiment, the sealing element 100 has a sheet metal piece that is segmented in the peripheral direction u (perpendicular to the plane of the drawing) with a fish-hook shape 25. A sealing surface 7 is shown inside a second radial region 5 at the radially outer end in the direction of the housing wall.

The segmented sheet metal with the fish-hook shape 25 is fixed at a web 15', which is constructed similar to the web 15 of FIG. 1, for which reason reference is made to the description in FIG. 1. The same is true for the first radial region 1, the second radial region 5, and the sealing surface 7.

Figure 3:
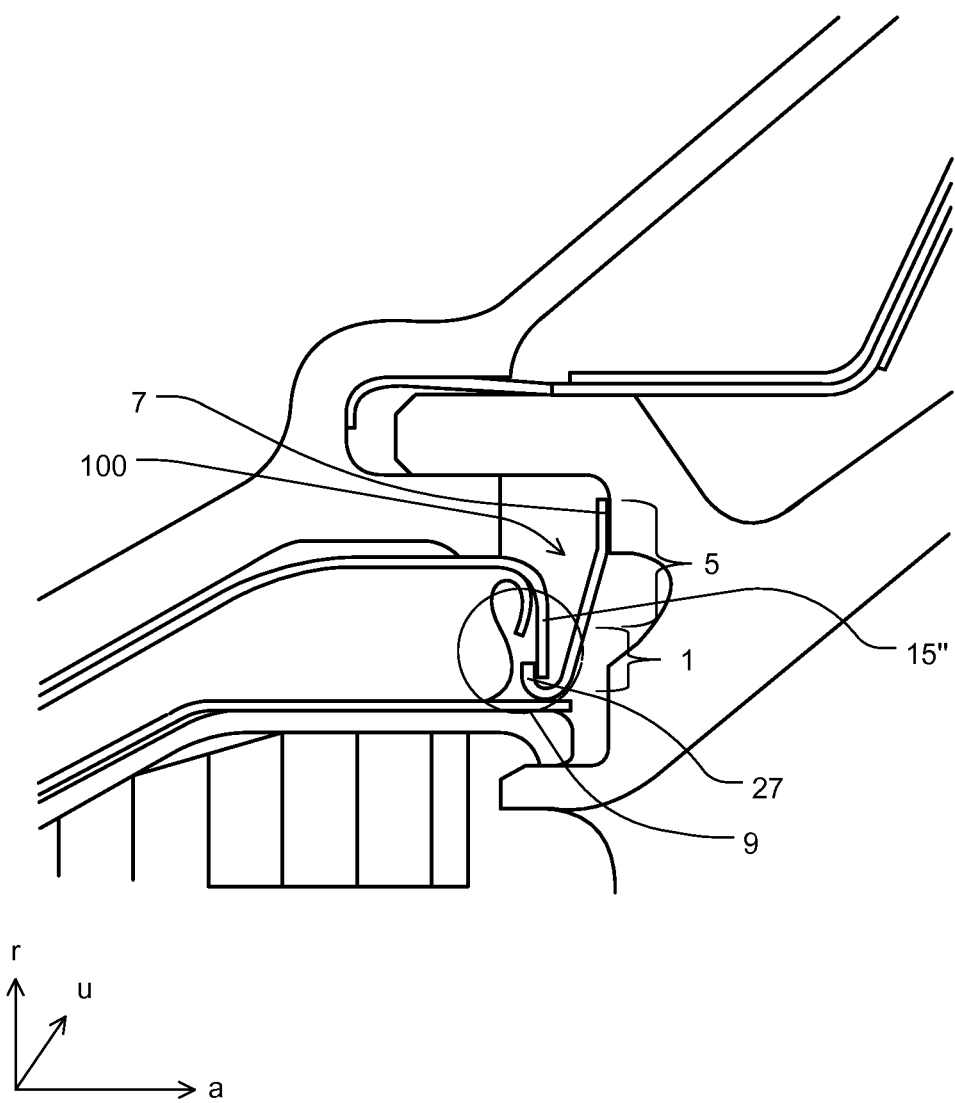
FIG. 3 shows yet another sealing element according to the invention in a view according to FIG. 1.

FIG. 3 shows yet another sealing element 100 according to the invention in a view according to FIG. 1.

In this example of embodiment, the sealing element 100 has a sheet metal piece that is segmented in the peripheral direction u (perpendicular to the plane of the drawing) with a V-hook shape 27). A sealing surface 7 is shown inside a second radial region 5 at the radially outer end in the direction of the housing wall.

The segmented sheet metal piece with the V-hook shape 27 is fixed at a web 15", which is constructed similar to the web 15 of FIG. 1, for which reason reference is made to the description in FIG. 1. The same is true for the first radial region 1, the second radial region 5, and the sealing surface 7.

FIG. 4a shows a sealing element 100 according to the invention in a view in the axial direction a (perpendicular to the plane of the drawing).

The sealing element 100 is shown as a segmented spiral sheet metal piece with a spiral 3. The segmented spiral sheet metal piece is shown in the installed state in FIG. 1 in a different view.

The following measurement dimensions are presented for clarification:

$R_{iD}$ Inner radius; radius from the axis of rotation of the gas turbine up to a radially inner end of the radial first region 1 of the sealing element 100;

$R_{aD}$ Outer radius; radius from the axis of rotation of the gas turbine up to a radially outer end of the radial second region 3 of the sealing element 100;

$L_D$ Arc length; length of a segment perimeter; and $\alpha$ Mid-point angle; angle over the arc length referred to the axis of rotation of the gas turbine.

FIG. 4b shows the sealing element 100 according to the invention of FIG. 4a in the plane B-B indicated in FIG. 4a.

The width $B_D$ shows the extent or length of the sealing element 100 in axial direction a.

FIG. 4c shows the sealing element 100 according to the invention in perspective view.

The invention claimed is:

1. A sealing element of an axial turbomachine for the sealing of regions at or in at least two static components of the turbomachine against flow media, wherein the components can move axially relative to one another due to thermal expansion, consisting essentially of:

the sealing element having an inner radius, an outer radius and segmented in a peripheral direction in at least two segments, each segment having an arc length, the arc length having a curvature about a mid-point angle, the sealing element further having a first radial region, lying radially inward at least at inner radius, with a first stiffness or rigidity and a second radial region, lying radially outward at most at outer radius with a second stiffness or rigidity, wherein the first radial region is spiral-shaped with a first distal end curved inwardly thereon, the second radial region comprising a sealing surface and a diagonal transition region between the first radial region and the sealing surface, the diagonal transition region extending in an axial and radial direction offsetting the first radial region axially from the sealing surface, wherein the first stiffness and the second stiffness are different from one another, the first stiffness being greater than the second stiffness and the first radial region is configured and arranged for attachment in a static component of the turbomachine, the sealing surface having a second distal end, the sealing surface and second distal end aligned perpendicular in an axial direction, the sealing surface further configured and arranged to form a seal against a flow media.

2. The sealing element according to claim 1, wherein the first radial region is configured and arranged for attachment in a groove or at a web in a static component of the turbomachine.

3. The sealing element according to claim 1, wherein the first radial region is configured and arranged for sealing engagement at a seal support of an inlet lining.

4. The sealing element according to claim 1, wherein the sealing surface of the sealing element is configured and arranged for sealing engagement at a guide vane suspension on the housing of the turbomachine.

5. The sealing element according to claim 1, wherein the regions to be sealed are disposed in a high-pressure turbine region and/or in a low-pressure turbine region of the turbomachine.

6. The sealing element according to claim 1, wherein the regions to be sealed are disposed in the housing of the turbomachine between a high-pressure turbine region and a low-pressure turbine region.

7. The sealing element according to claim 1, wherein the regions to be sealed are disposed between a combustion chamber on one side and a high-pressure turbine region or high-pressure compressor region on the other side.

* * * * *